MULTIFREQUENCY SIGNAL GENERATOR

Filed Sept. 1, 1966 3 Sheets-Sheet 1

INVENTORS R. J. DOW
R. W. WYNDRUM, JR.
BY E. J. Olinder
ATTORNEY

United States Patent Office 3,521,005
Patented July 21, 1970

3,521,005
MULTIFREQUENCY SIGNAL GENERATOR

Robert J. Dow, Amesbury, Mass., and Ralph W. Wyndrum, Jr., New Providence, N.J., assignors to Bell Telephone Laboratories, Incorporated, Murray Hill, N.J., a corporation of New York
Filed Sept. 1, 1966, Ser. No. 576,642
Int. Cl. H04m *1/26;* H03b *5/20;* H03h *7/10*
U.S. Cl. 179—90 4 Claims

ABSTRACT OF THE DISCLOSURE

A two-port, three-terminal notch filter network is formed from a pair of distributed parameter $\overline{RC}$ elements interconnected by a resistive element. A variable resistive element is connected between the capacitive terminals of th $\overline{RC}$ elements and a reference potential. The network is employed in the feedback circuit of a multifrequency signal oscillator.

This invention relates to variable frequency resistance-capacitance notch filters and more particularly to oscillators of the type whose frequency characteristics are determined by such filters.

It is well known that the cost and reliability of oscillator circuits may be enhanced and that their physical size may be reduced by the elimination of inductive circuit elements. An illustrative oscillator circuit of this type is shown for example by W.H. Orr, in a copending patent application Ser. No. 454,890, filed May 11, 1965 now Pat. No. 3,457,526. Orr discloses a twin-T notch filter comprising only resistors and capacitors connected in the feedback path of an amplifying circuit to form an oscillator that generates an output signal at the notch frequency. The term "notch filter" derives from the characteristic sharp attenuation of signals of one frequency in the filter transmission spectrum. A plot of the frequency spectrum of a filter of this type shows a distinct V-shaped notch at the attenuated frequency.

When employed in the feedback path of an oscillator, a notch filter produces a 180° phase shift in the signal oscillating at the notch frequency but sharply departs from this phase shift in the case of signals that are only slightly removed from the notch frequency. Thus, in the feedback loop of an oscillator whose amplifier has already effected a 180° phase shift, the additional 180° phase shift results in regenerative feedback at the notch frequency, while all other frequencies, the non-notch frequencies, are suppressed owing to their sharp phase departure.

An abrupt and substantial phase departure effect is most pronounced in so-called perfect notch filters. Perfect notch filters are unsuitable in oscillator feedback loops, however, because attenuation is total at the notch frequency where the desirable 180° phase shift occurs. In prior art notch filters it has been found that deviation from the perfect notch condition typically decreases the notch depth but also diminishes the phase departure effect, an undesirable characteristic if the filter is to be employed to establish a single frequency or very narrow band oscillator.

Many of the above-indicated problems found in notch filter oscillator design have been solved or at least alleviated by the circuit disclosed by Orr in his patent application cited above. Nevertheless, there are limitations in Orr's arrangement which restrict full exploitation of the potential broad utility of such circuits. For example, any lumped element structure such as a twin-T filter with all the necessary interconnections between elements limits the degree of circuit miniaturization that may be attained. Although considerable reduction in size can be achieved by employing thin film circuit techniques, as opposed to conventional discrete individual circuit components, an adverse reliability factor is inherent in lumped element thin film circuits that include discrete resistive elements. Specifically, a pinhole or other minor imperfection in a thin-line film-deposited resistive element can increase the designed resistance by a substantial percentage or cause the resistor to fail completely. Moreover, the fabrication of lumped element thin film circuitry, with individual resistors, capacitors and interconnections, is inherently detailed and costly owing to the complex patterns required for multiple photolithographic circuit delineation procedures.

Accordingly, a general object of the invention is to improve notch filter oscillators by enhancing reliability, reducing cost and enabling maximum miniaturization in circuit production without introducing undue complexity in fabrication techniques.

The principles of the invention stem in part from a realization that a switchable-frequency notch filter in the form of a distributed parameter network, in contrast to a conventional lumped element network, may be utilized as a frequency determining circuit for the feedback path of an amplifier-oscillator.

Distributed parameter circuits and the techniques for fabricating such circuits are well known. Pertinent literature in this field includes the following published papers: "Tantalum-Film Techonology" by D. A. McLean, N. Schwartz and E. D. Tidd, pages 1450–1462, published December 1964 in Proceedings of the IEEE; "Distributed Parameter Circuits and Microsystem Electronics" by P. S. Castro and W. W. Happ, pages 448–460, National Electronics Conference Proceedings of 1960; "The Exact Realization of Distributed RC Driving Point Functions" by R. W. Wyndrum, Jr., WESCON Technical Papers, 1964, part 2, 18.1; and "The Realization of Monomorphic Thin Film Distributed RC Networks" by R. W. Wyndrum, Jr., Proceedings of the IEEE, pt. 10, 1966.

The reduction in volume that may be achieved through the use of distributed parameter thin film circuits, as opposed to lumped parameter circuits, arises because resistance and capacitance functions occupy the same substrate, and many interconnections are eliminated. An additional advantage in improved reliability results from a reduction in the number of interconnections that must be deposited. In distributed parameter resistance-capacitance elements, conventionally designated $\overline{RC}$ elements, resistive and capacitive films are intimate contact from the time that the films are made and hence require no interconnections. Additionally, when resistive films and capacitive films are deposited so that their electromagnetic fields interact, many network functions can be realized which are not obtainable using only only lumped resistors and capacitors. An important advantage of distributed parameter circuits stems from the fact that they are in essence "area" circuits and fine-line resistive deposits are not required. Consequently, from the standpoint of reliability, such circuits are uniquely tolerant to pinholes and other minor film imperfections.

An additional significant advantage of an oscillator feedback network embodying a distributed parameter notch filter in accordance with the invention derives from the substantially homogenous nature of its structure which ensures a high degree of reliability under conditions of thermal expansion. As described by McLean, Schwartz and Tidd in the paper cited above, distributed parameter circuits may be fabricated almost entirely from a single homogeneous substance such as tantalum and oxides thereof and as a result thermal effects and expansion coefficients are substantially uniform throughout the device structure. It is, of course, well known that the photolithographic patterns required for distributed parameter $\overline{RC}$ circuits are substantially less complex than for fabrication of similar lumped element networks.

The desirability of employing a distributed parameter rsistive-capacitive filter in the feedback path of an amplifier-oscillator has been pointed out previously in a paper, "Theory of a Monolithic Null Device and Some Novel Circuits" by W. M. Kaufman, published in Proceedings of the IRE, September 1960, pages 1540–1545. Although a wide variety of distributed parameter $\overline{RC}$ networks are disclosed in the prior art, as shown for example by Castro and Happ in the paper cited above, no such prior art circuit has been devised that has a readily switchable notch frequency and a substantially fixed notch depth.

In accordance with the invention, a distributed parameter variable notch filter circuit includes a pair of $\overline{RC}$ elements in combination with a pair of resistive elements forming a simple three-terminal, two-port network. Of the three terminals of an $\overline{RC}$ element, two are termed resistive terminals, inasmuch as a measurement of the resistive property may be made across these terminals, and the third terminal is termed capacitive inasmuch as the capacitive property of the device may be measured from that terminal to either of the resistive terminals.

In the network constructed in accordance with the principles of the invention, one of the resistive terminals of each of the $\overline{RC}$ elements forms a respective network terminal, and the two free terminals of the $\overline{RC}$ elements are bridged by a resistive element. One terminal of a second resistive element is connected to the capacitive terminal of each of the $\overline{RC}$ elements and the second terminal corresponds to the third or common terminal of the network.

In accordance with one aspect of the invention, the notch frequency of the filter may be shifted without any substantial effect on notch depth by varying the resistance of either of the resistive elements alone. Since the number of switches and auxiliary circuit cost and complexity are all minimized, such a circuit is particularly useful as a part of a varibale frequency oscillator.

In accordance with another aspect of the invention, the distributed parameter network described may employ unequal $\overline{RC}$ sections. There are special advantages in the employment of such an asymmetrical network; namely, the loading effect of the feedback network on the amplifier output may be minimized by using an $\overline{RC}$ input network with a large resistive component and a small capacitive component. Similarly, the loop transmission may be substantially improved by having a low impedance level $\overline{RC}$ network feeding the input of the amplifier and a relatively high impedance $\overline{RC}$ network at the input of the feedback network. By exploiting this form of feedback network asymmetry, the gain requirements on the amplifier section may be substantially reduced, permitting a less costly amplifier embodiment.

In a network in accordance with the invention, deepening and narrowing the filter notch by appropriate tailoring of component magnitudes increases frequency stability, but when the network is employed in the feedback path of an oscillator such tailoring also increases the need for amplifier gain. It is a feature of the invention that optimum "design trade-off" may be employed to achieve the desired balance between conflicting parameters such as notch depth and amplifier gain by utilizing one of the asymmetrical circuit forms described above.

In one illustrative embodiment of the invention, each of two interconnected transistor-oscillators employs a distributed parameter $\overline{RC}$ variable notch filter in the feedback path of its associated amplifier. Through selective switching means, a particular one of several frequency determining resistive elements in each of the notch filter networks may be selectively introduced with the result that a dual frequency tone signal is applied to the common output point of the circuit. Such a circuit is potentially very attractive for use in multifrequency signal generators such as Touch-Tone generators those employed in multifrequency signaling telephone sets.

The principles of the invention as well as additional objects and features thereof will be fully apprehended from the following detailed description of an illustrative embodiment and from the drawing in which.

To ensure a full appreciation of all aspects of the invention, the description of an illustrative embodiment will be prefaced by a brief discussion of some of the theoretical considerations involved in the design of oscillators employing notch filter feedback networks. The form to be chosen for any R-C oscillator should ensure maximum frequency stability. The parameters of interest may be discussed in terms of an oscillator of the conventional form shown in FIG. 2. Assume first that the amplifier gain is nominally constant and that the feedback network has a shaped function designed to provide loop characteristics fulfilling the well-known Barkhausen oscillation criteria at one frequency. These criteria are two-fold: if $|A\beta(\omega)|$ is just greater than unity at some frequency $f_o$ (where $A\beta$ is the conventional feedback factor) and simultaneously, a total loop phase shift of exactly 360° is provided at $f_o$, the circuit shown in FIG. 2 will oscillate at $f_o$. The amplitude of oscillation is limited either by the active element supply voltage, active element nonlinearities or by some automatic volume control (AVC) circuit. If as is true at low frequencies, the phase shift of the amplifier is approximately 180°, then the phase shift contributed by the $\beta$ network must also be 180°. When the oscillator experiences environmentally caused elementary parameter changes, as a result of temperature or humidity for example, it is important for frequency stability that the passive $\beta$ network be able to change its transmission magnitude and phase characteristics to meet the Barkhausen criteria with a negligible change in $f_o$.

Phase and magnitude instability factors $S_p$ and $S_m$, respectively, for the feedback network shown in FIG. 2 may be defined as follows:

$$S_p = \frac{\Delta f_o / f_o}{\Delta \varphi} \text{ and } S_m = \frac{\Delta f_o / f_o}{\Delta |\beta|} \qquad (1)$$

where $|\beta|$ is the absolute magnitude of $\beta$ at some phase angle $$\varphi(\beta = |\beta| \measuredangle \varphi)$$

It is apparent that these factors should be minimized in any design. Changes in $\beta$ may be required by deviations in the amplifier gain in order to satisfy loop gain conditions for oscillation.

Figure 2:
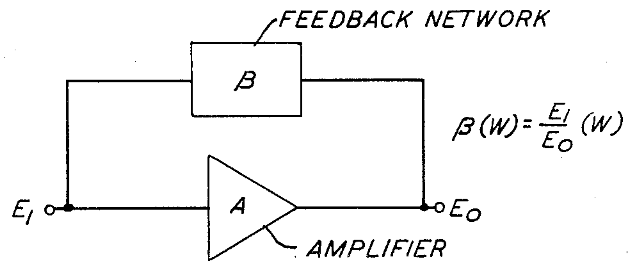
FIG. 2 is a block diagram of a conventional oscillator circuit.
Figure 3:
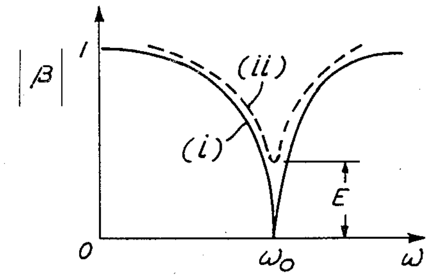
FIGS. 3 and 4 are plots of the amplitude and phase characteristcis of an infinite rejection notch network and of a notch network suitable for use as an oscillator feedback network.

In FIG. 3 the curve (*i*) is a plot of the amplitude characteristics of a so-called perfect notch filter, and the curve (*ii*) is a plot of the amplitude characteristics of a realizable notch filter. The magnitude $\epsilon$ on the $\beta$ axis, which may be defined as the ratio of feedback network output to feedback network input, is also a measure of the notch depth difference between a perfect notch filter and a practical filter suitable for use in the feedback network of the circuit shown in FIG. 2.

Figure 4:
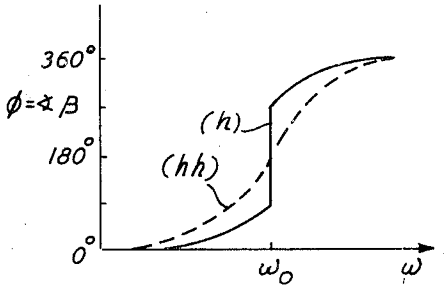

In FIG. 4 the solid curve (*h*) is a plot of the phase characteristics of a perfect notch filter and the dotted curve (*hh*) is a plot of the phase characteristics of a notch filter suitable for use in the feedback network $\beta$ of FIG. 2. If environmental changes produce uniform percentage changes in all resistive and capacitive elements of a given R-C feedback network which nominally produces a perfect notch, small deviations will cause a change in notch frequency, but the notch will still be perfect, which is to say that a perfect zero of transmission will occur at a slightly different frequency. It can also be shown that this conclusion is equally applicable to lumped R-C networks and to distributed $\overline{RC}$ networks.

If an R-C network is not a perfect notch circuit, but in the complex frequency (S) plane possesses a dominant zero of transmission to the right of the $j\omega$ axis, the effect of a one percent increase in the R-C product of the network is to reduce the notch frequency by one percent. This conclusion applies to both lumped R-C notch structures and to distributed $\overline{RC}$ notch structures. Accordingly, the change of a single element such as a shunt resistor in the notch network will alter both the notch depth and frequency in all R-C notch filters, unless elaborate component proportioning is undertaken as taught by Orr. A like change in any known prior art distributed $\overline{RC}$ notch network has a similar effect in that both notch depth and notch frequency are altered.

Figure 5A:
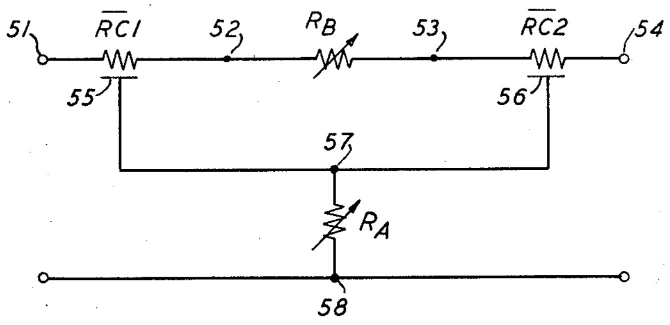
FIG. 5A is a schematic circuit diagram of a distributed parameter $\overline{RC}$ notch filter in accordance with the invention.
Figure 5B:
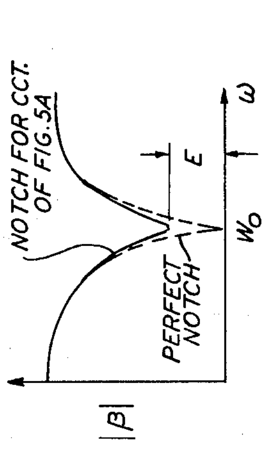
FIGS. 5B and 5C are plots of the amplitude and phase characteristics of the circuit shown in FIG. 5A and of a "perfect notch" circuit.
Figure 5C:
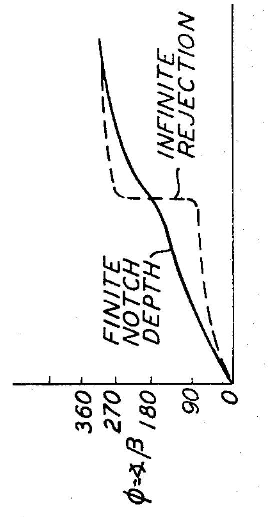

A notch network embodying the principles of the invention is shown in FIG. 5A. This network includes a pair of distributed parameter $\overline{RC}$ sections $\overline{RC}$1 and $\overline{RC}$2 connected in series relation by a first variable resistor $R_B$. Two of the three terminals of the network are formed by the resistive terminals 51 and 54 of the $\overline{RC}$1 and $\overline{RC}$2 components. Each of the capacitive terminals 55 and 56 is connected to the third network terminal 58 by way of a common variable shunt resistor $R_A$. A key distinguishing feature of the network shown in FIG. 5A as contrasted with other known distributed $\overline{RC}$ networks is that the notch frequency of the filter may be shifted by varying the resistance of either resistor $R_A$ or of the resistor $R_B$ without, however, any substantial effect on the notch depth. This feature stems in part from the complex interactions that occur between the electrical fields associated with the resistive capacitive films of the $\overline{RC}$ elements. Amplitude and phase characteristics of the circuit of FIG. 5A are illustrated by the curves plotted in FIGS. 5B and 5C respectively.

The feature that permits magnitude variations of either of the resistors $R_A$ or $R_B$ to effect changes in notch frequency with no substantial variation in notch depth gives the circuit a unique flexibility, thereby ensuring ready adaptability for use as a feedback network in any one of a variety of oscillator circuits.

The driving point and transfer function frequency characteristics of the network shown in FIG. 5A are readily obtainable by straightforward computer analysis techniques. If the circuit is to be employed as the feedback network of an oscillator configuration, resistance magnitudes of the resistors $R_A$ and $R_B$ should be chosen for a feedback network gain of $$\{\epsilon \measuredangle \varphi\} \text{ at } f_o$$

where the network gain $\epsilon$ is a small real number (from .02 to 0.2), and the nominal gain of the amplifier should be defined by the expression $$\{1/\epsilon \measuredangle (360-\varphi)\}$$

Figure 6:
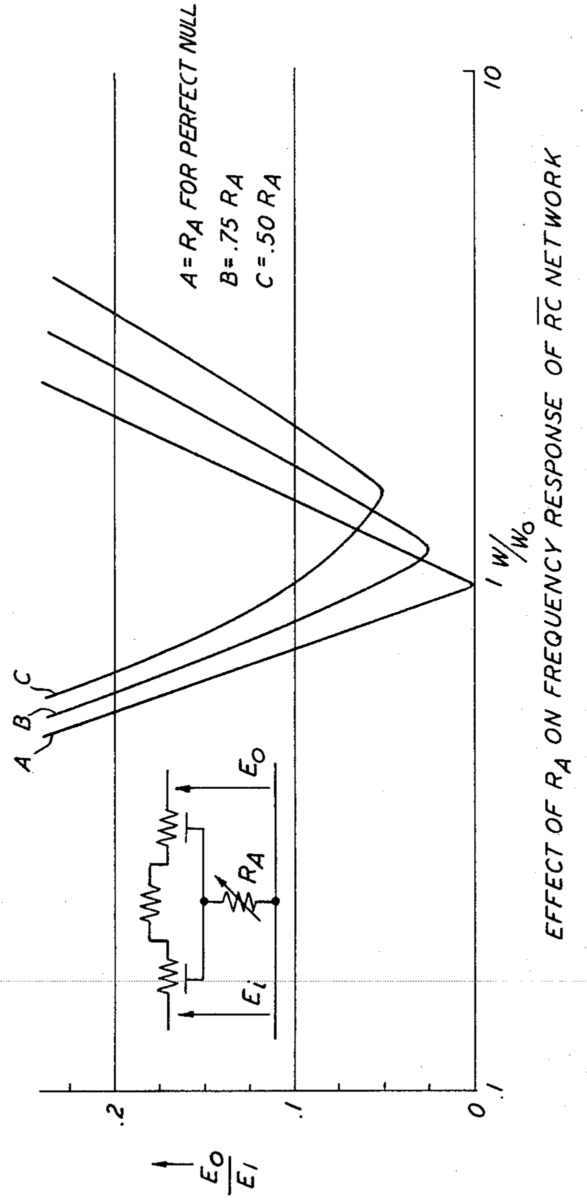
FIG. 6 is a plot of a family of curves illustrating the effect on frequency response of variations in the magnitude of one of the indicated elements in the circuit shown in FIG. 5A.

As indiated above, in the circuit shown in FIG. 5A there are special advantages in the employment of unequal $\overline{RC}$ sections. If the circuit is thus made asymmetrical, the loading effect of the feedback network on the amplifier output may be minimized by using an $\overline{RC}$ network with a large resistive component and a small capacitive component. Similarly, the loop transmission may be substantially improved by having a low impedance level $\overline{RC}$ network feeding the input of the amplifier. By exploiting circuit asymmetry in the manner indicated, the gain requirements on the amplifier section may be substantially reduced, thus permitting a less costly amplifier embodiment. The loaded feedback network loss can be evaluated from curves similar to those shown in FIG. 6. A non-minimum phase $\overline{CR}$ network with a deeper and sharper or narrower notch permits greater frequency stability but, on the other hand, requires more amplifier gain. A design trade-off is thus made available and as a result an oscillator with a single transistor-amplifier section is considered to be feasible.

Figure 1:
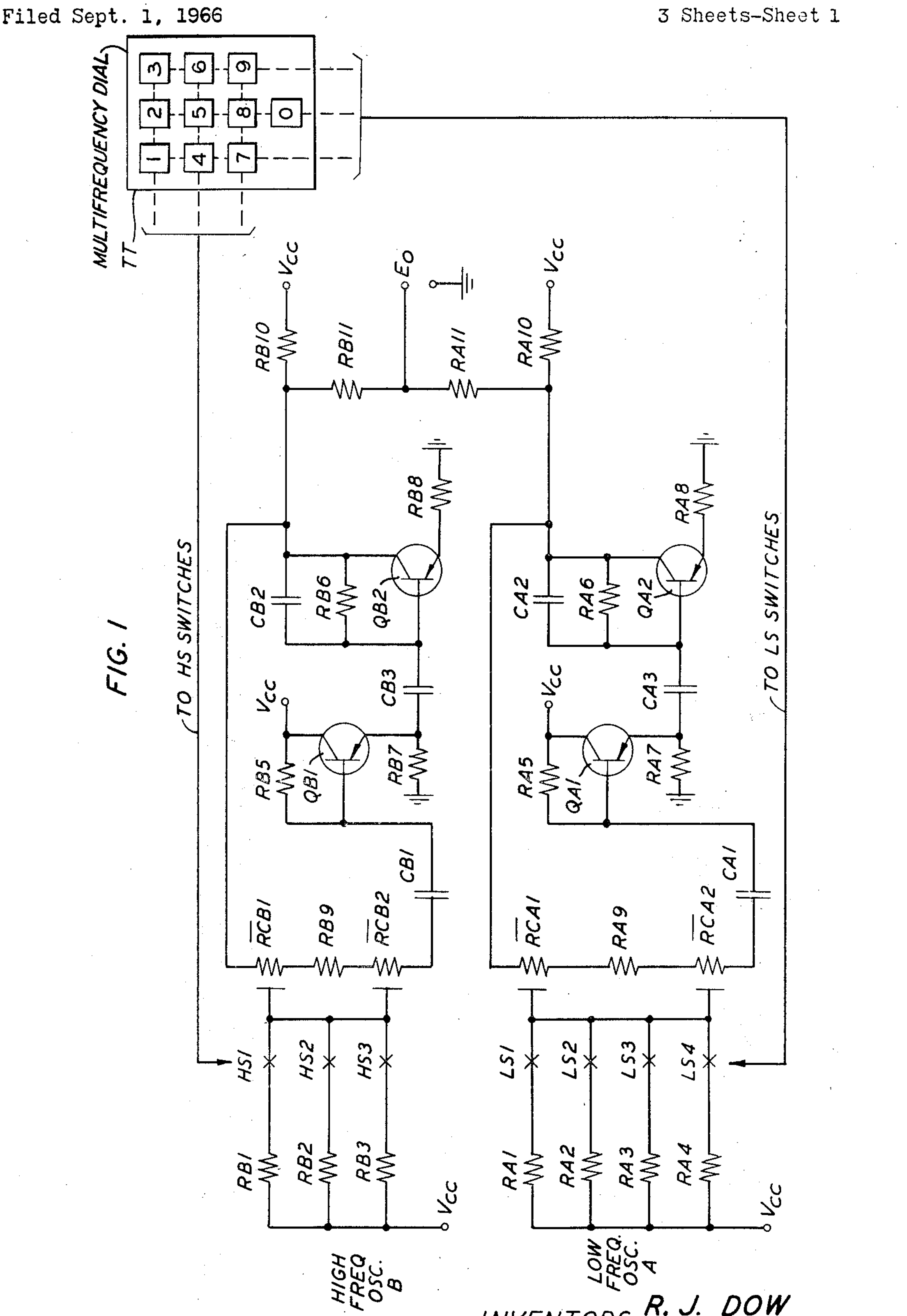
FIG. 1 is a schematic circuit diagram of a variable dual frequency signal generator embodying the principles of the invention.

All of the significant features of a circuit of the type shown in FIG. 5A are tuned to account by its embodiment as the frequency determining means in a dual frequency signal generator as shown in FIG. 1. A generator of this type is readily adaptable for use as the dial signal circuit of a multifrequency signaling telephone. In FIG. 1 a conventional Touch-Tone multifrequency dial TT is included in order to illustrate the use of the circuit as a dial signal generator.

In FIG. 1 a first oscillator A generates any one of three frequencies in a high frequency group, and a second oscillator B generates any one of four frequencies in a low frequency group. The particular combination of two simultaneously generated frequencies is selected by an operated one of the pushbuttons on the dial TT. For example, operation of the pushbutton designated "4" operates switch HS2 to connect frequency determining resistor RB2 into the feedback network that includes distributed $\overline{RC}$ elements $\overline{RC}$B1 and $\overline{RC}$B2 and a connecting fixed resistor RB9. Operation of pushbutton "4" also operates switch LS1 to connect frequency determining resistor RA1 into the feedback network comprising distributed $\overline{RC}$ elements $\overline{RC}$A1 and $\overline{RC}$A2 and a connecting fixed resistor RA9.

The two amplifier circuits are identical and conventional. In the amplifier of oscillator B, a first transistor stage QB1 is coupled to the second or output transistor stage QB2 by capacitor CB3. Resistors RB7 and RB8 establish the respective emitter biasing potentials. Base bias is fixed by resistors RB5 and RB6 and a capacitor CB2 provides feedback stabilization for transistor QB2. Signals from the notch filter feedback network are applied to the base of transistor QB1 by capacitor CB1. Power to the circuit is supplied from the source $V_{cc}$. Outputs from the collector of transistor QB2 and from the collector of transistor QA2, the output transistor of the amplifier of oscillator A, are applied to the common output point $E_o$ by way of resistors RB11 and RA11, respectively. Corresponding circuit components in the oscillator A are similarly designated and perform like functions. In conventional fashion each pair of frequencies selected by the operation of one of the switches LS1 through LS3 and by one of the switches SH1 through SH4 is indicative of a dialed digit in terms of a frequency code.

In the interest of clarity, the circuit of FIG. 1 is shown in a simplified form insofar as its adaptation for use as a telephone dial signal generator is concerned. Additional circuit details for an arrangement of this general type are disclosed by R. L. Breeden and R. M. Rickert in U.S. Pat. 3,424,870 issued Jan. 28, 1969.

It is to be understood that the embodiment described herein is merely illustrative of the principles of the invention. Various modifications thereto may be effected by persons skilled in the art without departing from the spirit and scope of the invention.

What is claimed is:

1. A first oscillatory signal generator comprising, in combination, an amplifier having an input point and an output point; a regenerative feedback network comprising a notch filter connected between said input and output points; said filter including first and second distributed parameter $\overline{RC}$ elements each having a respective pair of resistive terminals and a respective capacitive terminal, a resistive terminal of said first $\overline{RC}$ element being connected to said input point, a resistive terminal of said second $\overline{RC}$ element being connected to said output point, a first resistive element connected between the free resistive terminals of said $\overline{RC}$ elements, a plurality of second resistive elements each having a unique resistive magnitude, a source of potential, means connecting one terminal of each of said second resistive elements to said source, and switching means for selectively connecting any one of the free terminals of said second resistive elements to each of said capacitive terminals of said $\overline{RC}$ elements, whereby the notch frequency of said filter and hence the operating frequency of said generator may be shifted in correspondence with the resistive magnitude of a particular one of said resistive elements by said switching means without, however, substantially affecting the notch depth of said filter.

2. Apparatus in accordance with claim 1 wherein said $\overline{RC}$ elements are proportioned asymmetrically, said first $\overline{RC}$ element having a relatively low resistance component and a relatively high capacitance component and said second $\overline{RC}$ element having a relatively high resistance component and a relatively low capacitance component thereby minimizing the loading effect of said network on said amplifier without affecting the frequency transmission characteristics of said network.

3. Signal generating apparatus for signaling over a telephone line comprising, in combination, first and second oscillator circuits each having a respective input point and a common output point, each of said circuits including a respective amplifier with a respective regenerative feedback path including a respective notch filter network, said network comprising first and second distributed parameter $\overline{RC}$ elements each having a respective pair of resistive terminals and a respective capacitive terminal, a resistive terminal of said first $\overline{RC}$ element being connected to said input point, a resistive terminal of said second $\overline{RC}$ element being connected to said output point, a first resistive element connected between the free resistive terminals of said $\overline{RC}$ elements, a plurality of second resistive elements each having a unique resistive magnitude, the magnitudes of said second resistive elements in said first oscillator circuit differing from the resistive magnitudes of corresponding elements in said second oscillator circuit, a source of potential, means connecting one terminal of each of said second resistive elements to said source, means connecting said amplifier in each of said oscillator circuits to said source, a pushbutton dial, switching means responsive to the operation of a digit indicating pushbutton of said dial for selectively connecting any one of the free terminals of said second resistive elements in each of said oscillators to each of said capacitive terminals of said $\overline{RC}$ elements associated therewith, whereby the notch frequency of each of said filters and hence the operating frequency of said oscillators may be shifted in correspondence with the resistive magnitude of connected ones of said second resistive elements and a dual frequency signal may be applied to said common output point, the frequency combination of said signal being indicative of a dialed digit in terms of a frequency code.

4. Apparatus in accordance with claim 3 wherein said $\overline{RC}$ elements are proportioned asymmetrically, said first $\overline{RC}$ element having a relatively low resistance component and a relatively high capacitance component and said second $\overline{RC}$ element having a relatively high resistance component and a relatively low capacitance component, thereby minimizing the loading effects of said networks on said amplifiers without affecting the frequency transmission characteristics of said networks.

References Cited

UNITED STATES PATENTS

| | | | |
|---|---|---|---|
| 2,778,940 | 1/1957 | Sulyer | 331—142 X |
| 3,242,442 | 3/1966 | Ishimoto et al. | 331—56 X |
| 3,361,991 | 11/1968 | Wyndrum | 333—75 X |
| 3,212,032 | 10/1965 | Kaufman | 333—70 |
| 3,072,868 | 1/1963 | Lucka et al. | 333—75 |
| 3,223,941 | 12/1965 | Schroeder et al. | 333—75 X |
| 3,184,554 | 5/1965 | Meacham et al. | 179—90 |

OTHER REFERENCES

Gottlieb, Irving M.: Basic Oscillators, John F. Rider, Publisher, Inc., New York, 1963. Library of Congress Catalog Card No. 63-19157, pp. 126-127 and 60-61.

KATHLEEN H. CLAFFY, Primary Examiner

T. J. D'AMICO, Assistant Examiner

U.S. Cl. X.R.

331—135; 333—70